United States Patent [19]
Kaushik et al.

[11] Patent Number: 5,726,805
[45] Date of Patent: Mar. 10, 1998

[54] OPTICAL FILTER INCLUDING A SUB-WAVELENGTH PERIODIC STRUCTURE AND METHOD OF MAKING

[75] Inventors: Sumanth Kaushik; Brian R. Stallard, both of Albuquerque, N. Mex.

[73] Assignee: Sandia Corporation, Albuquerque, N. Mex.

[21] Appl. No.: 670,115

[22] Filed: Jun. 25, 1996

[51] Int. Cl.$^6$ .............................. G02B 5/18; G02B 5/26; G02B 5/28; G02B 5/30
[52] U.S. Cl. ..................... 359/589; 359/590; 359/568; 359/498
[58] Field of Search ........................... 359/568, 589, 359/585, 586, 590, 494, 498, 359, 360, 831; 372/96, 45

[56] References Cited

U.S. PATENT DOCUMENTS

| | | | |
|---|---|---|---|
| 3,552,826 | 1/1971 | Hanes | 350/166 |
| 3,699,347 | 10/1972 | Buchan | 250/217 R |
| 3,929,398 | 12/1975 | Bates | 356/186 |
| 4,547,074 | 10/1985 | Hinoda | 356/405 |
| 4,822,998 | 4/1989 | Yokota | 250/226 |
| 5,038,041 | 8/1991 | Egan | 250/349 |
| 5,120,622 | 6/1992 | Hanrahan | 430/7 |
| 5,144,498 | 9/1992 | Vincent | 359/885 |
| 5,175,697 | 12/1992 | Kawagoe | 364/526 |
| 5,291,332 | 3/1994 | Siebert | 359/589 |
| 5,293,548 | 3/1994 | Siebert | 359/580 |
| 5,305,233 | 4/1994 | Kawagoe | 364/526 |
| 5,602,866 | 2/1997 | Fukunaga | 372/102 |

OTHER PUBLICATIONS

D. C. Flanders, "Submicrometer Periodicity Gratings as Artificial Anisotropic Dielectrics," *Applied Physics Letters*, vol. 42, pp. 492–494, 15 Mar. 1983.

R. C. Enger and S. K. Case, "Optical Elements with Ultra-high Spatial–Frequency Surface Corrugations," *Applied Optics*, vol. 22, pp. 3220–3228, 15 Oct. 1983.

Y. Ono, Y. Kimura, Y. Ohta, and N. Nishida, "Antireflection Effect in Ultrahigh Spatial–Frequency Holographic Relief Gratings," *Applied Optics*, vol. 26, pp. 1142–1146, 15 Mar. 1987.

N. F. Hartman and T. K. Gaylord, "Antireflection Gold Surface–Relief Gratings: Experimental Characteristics," *Applied Optics*, vol. 27, pp. 3738–3743, 1 Sep. 1988.

R. Magnusson and S. S. Wang, "New Principle for Optical Filters," *Applied Physics Letters*, vol. 61, pp. 1022–1024, 31 Aug. 1992.

D. H. Raguin and G. M. Morris, "Analysis of Antireflection–Structured Surfaces with Continuous One–Dimensional Surface Profiles," *Applied Optics*, vol. 32, pp. 2582–2598, 10 May 1993.

S. Kaushik and B. R. Stallard, "A Two Dimensional Array of Optical Interference Filters Produced by Lithographic Alterations of the Index of Refraction," *Proceedings of SPIE—The International Society for Optical Engineering*, vol. 2532, pp. 276–281, 10 Jul. 1995.

B. R. Stallard, M. J. Garcia, and S. Kaushik, "Near–IR Reflectance Spectroscopy for the Determination of Motor Oil Contamination in Sandy Loam," *Applied Spectroscopy*, vol. 50, pp. 334–338, Mar. 1996.

*Primary Examiner*—Jon W. Henry
*Attorney, Agent, or Firm*—John P. Hohimer

[57] ABSTRACT

An optical filter includes a dielectric layer formed within a resonant optical cavity, with the dielectric layer having formed therein a sub-wavelength periodic structure to define, at least in part, a wavelength for transmission of light through the resonant optical cavity. The sub-wavelength periodic structure can be formed either by removing material from the dielectric layer (e.g. by etching through an electron-beam defined mask), or by altering the composition of the layer (e.g. by ion implantation). Different portions of the dielectric layer can be patterned to form one or more optical interference filter elements having different light transmission wavelengths so that the optical filter can filter incident light according to wavelength and/or polarization. For some embodiments, the optical filter can include a detector element in optical alignment with each optical interference filter element to quantify or measure the filtered light for analysis thereof. The optical filter has applications to spectrometry, colorimetry, and chemical sensing.

23 Claims, 9 Drawing Sheets

OPTICAL FILTER INCLUDING A SUB-WAVELENGTH PERIODIC STRUCTURE AND METHOD OF MAKING

This invention was made with Government support under Contract No. DE-AC04-94AL85000 awarded by the U.S. Department of Energy. The Government has certain rights in the invention.

FIELD OF THE INVENTION

The present invention relates generally to optical filters for filtering light according to wavelength, and in particular to an optical filter including one or more optical interference filter elements therein with applications to spectrometry, colorimetry, and chemical sensing; and to a method for constructing such an optical filter.

BACKGROUND OF THE INVENTION

Optical interference filters of the Fabry-Perot type can be used to filter out all wavelengths of radiation (i.e. light) except for a narrow band of light centered about a particular wavelength. When light must be filtered at a plurality of different wavelength bands (e.g. for spectrometry or colorimetry), the use of a plurality of individual optical interference filters can result in a large and costly assembly which cannot be easily integrated with conventional detectors (e.g. a detector array). Alternately, the integration of a plurality of individual optical interference filters (or filter elements) into a monolithic filter array has been achieved by the use of stepped (i.e. staircase) or wedged interference filters (see e.g. U.S. Pat. Nos. 4,822,998 and 5,144,498), and also by the deposition of a plurality of interference filter coatings having different layer thicknesses on different areas of a substrate for use at different wavelengths ($\lambda_1$–$\lambda_n$) (see e.g. U.S. Pat. Nos. 4,547,074 and 5,038,041).

A disadvantage of previous or current wedged optical interference filters is that the bandpass wavelength varies continuously across a width of the wedged filter, thereby limiting a spatial extent or size of a light beam that can be filtered with a predetermined bandwidth (the bandwidth increases with the size of the light beam). The stepped and wedged optical interference filters are also difficult to fabricate as two-dimensional filter arrays which are preferred for filtering two-dimensional (e.g. circular) light beams. Furthermore, a bandpass wavelength of each filter element within the stepped or wedged optical interference filter array cannot be arbitrarily selected, since adjacent filter elements must generally have bandpass wavelengths that are closely spaced in wavelength.

The previous or current optical interference filters formed with multiple coatings of different layer thicknesses or at different wavelengths ($\lambda_1$–$\lambda_n$) require the use of multiple masking and deposition steps, thereby increasing fabrication time and cost, and the possibility for fabrication errors in spatial alignment of the coatings or in the layer thicknesses of the coatings.

An advantage of the present invention is that an optical filter that includes one or more optical interference filters therein can be formed with a single wavelength-determining dielectric layer located within an optical cavity. By selectively and locally altering an index of refraction of the dielectric layer, one or more optical interference filter elements can be formed with predetermined center wavelengths and sizes.

Another advantage of the present invention is that an optical filter containing a plurality of individual optical interference filters (i.e. filter elements) can be fabricated on a common substrate in the form of a one-dimensional or two-dimensional optical interference filter array, with a size and center wavelength of each filter element being independently selectable over a wide range or interval without a need for adjacent filter elements being closely spaced in wavelength. This ability to arbitrarily select particular center wavelengths for the filter elements allows the use of only those center wavelengths that are needed for a particular usage of the optical filter.

Yet another advantage of the optical filter of the present invention is that the optical filter can be formed compactly, with each filter element having a size and lateral spacing that is compatible with conventional detector arrays so that a detector array can be integrated into the optical filter to form a miniature spectrometer, chemical sensor, or colorimeter for detecting or measuring light of different wavelengths. The optical filter of the present invention can further be tailored during manufacture thereof to provide either a minimal number (e.g. $\leq 10$) of filter elements sufficient for transmitting light at particular wavelengths (e.g. for analyzing a particular chemical species, or particular colors of light); or alternately, the optical filter can have a large number (e.g. $\geq 100$) of filter elements spaced at regular wavelength intervals to provide sufficient wavelength resolution to measure an entire wavelength spectrum (e.g. for analysis of any chemical species having spectral features therein, or for measuring an entire spectrum of colors).

Yet another advantage of the optical filter according to the present invention is that fabrication of one or more optical interference filter elements therein is simplified at infrared wavelengths compared to previous or current wedged or stepped interference filters. At infrared wavelengths, lateral dimensions of a sub-wavelength periodic structure formed within the optical filter of the present invention are increased, thereby relaxing lithography requirements and allowing the use of optical photolithography for forming the sub-wavelength periodic structure. However, for the wedged or stepped interference filters, vertical dimensions must be increased at infrared wavelengths, thereby complicating fabrication by requiring greater etch depths (e.g. in a stepped or staircase filter) or larger wedge angles (e.g. in a wedged filter). These larger vertical dimensions can further degrade performance of the previous or current filters at infrared wavelengths (e.g. by generating off-normal surface reflections in a wedged filter having an increased wedge angle).

These and other advantages of the optical filter and method of the present invention will become evident to those skilled in the art.

SUMMARY OF THE INVENTION

The present invention provides an optical filter and a method of making the optical filter. The optical filter comprises at least one optical interference filter element, with each optical interference filter element further comprising a dielectric layer having a sub-wavelength periodic structure formed therein to define, at least in part, a wavelength for transmission of light, and mirrors above and below the dielectric layer to form an optical cavity thereabout. In some embodiments of the present invention, the sub-wavelength periodic structure can be a zeroth-order diffraction grating; whereas in other embodiments, a periodic structure having two orthogonal axes of symmetry in the plane of the dielectric layer can be used. The optical filter of the present invention can further include one or more wavelength-blocking filters for blocking the transmission of light at wavelengths other than a passband of the filter (e.g. for blocking additional Fabry-Perot resonances outside the passband), and a detector element in optical alignment with each filter element to detect any light transmitted therethrough.

Additional advantages and novel features of the invention will become apparent to those skilled in the art upon examination of the following detailed description thereof when considered in conjunction with the accompanying drawings, or may be learned by practice of the invention.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
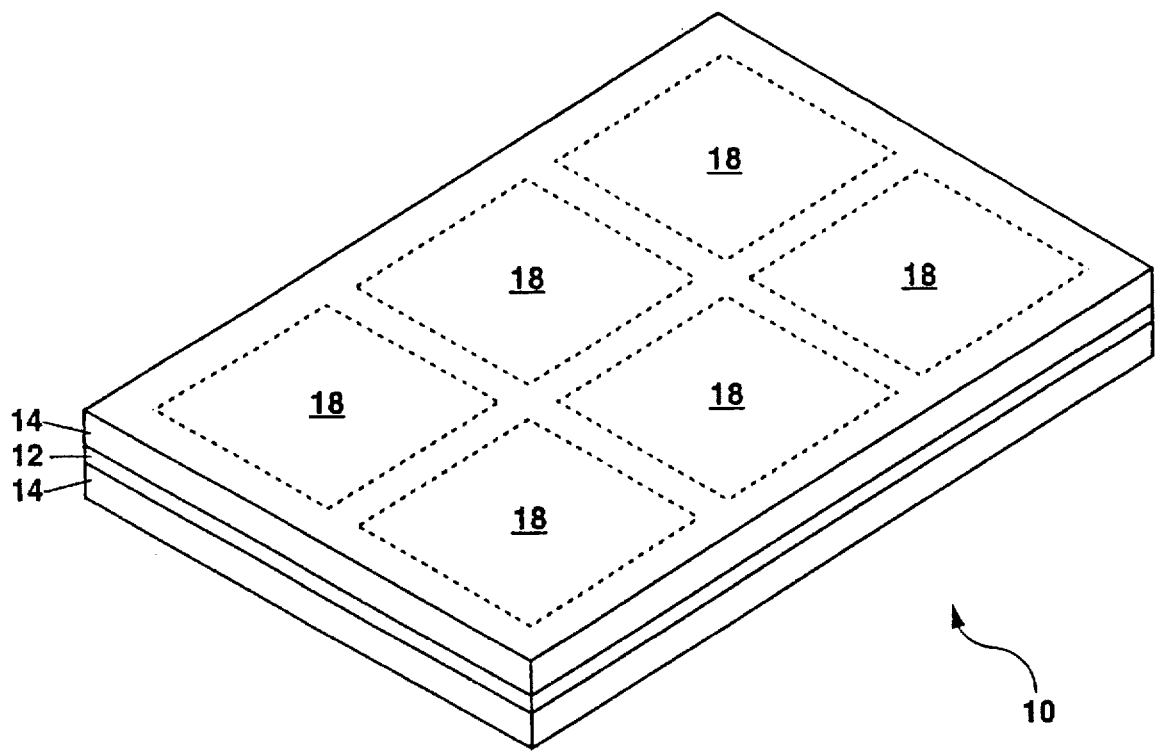
FIG. 1 shows schematically a perspective view of one embodiment of the optical filter according to the present invention.

Referring to FIG. 1, there is shown schematically a perspective view of an embodiment of an optical filter 10 according to the present invention. The optical filter 10 comprises a layered structure with a dielectric layer 12 being sandwiched between a pair of mirrors 14 forming a resonant optical cavity (i.e. a Fabry-Perot cavity) for filtering incident light within a predetermined wavelength range. The word "light" is used herein to refer to any portion of the electromagnetic spectrum.

In FIG. 1, the dielectric layer 12 can comprise any transparent amorphous or crystalline dielectric material, including glass, quartz, silicon dioxide, magnesium fluoride, aluminum oxide, titanium dioxide, cadmium oxide, cerium oxide, zirconium dioxide, zinc sulfite, silicon nitride, polymers (e.g. polyimide), or semiconductors (e.g. silicon, germanium, gallium arsenide, aluminum gallium arsenide). The dielectric layer 12 includes a sub-wavelength periodic structure 16 formed therein as will be described in detail hereinafter. The term "sub-wavelength" as used herein means smaller than a predetermined wavelength of light. Thus, the sub-wavelength periodic structure 16 is formed according to the present invention with a periodicity along at least one lateral axis thereof that is less than a predetermined wavelength of the incident light; and the periodicity is preferably less than about one-half of the predetermined wavelength of the incident light (i.e. $\leq \lambda/2$).

The sub-wavelength periodic structure 16 defines, at least in part, a center wavelength, $\lambda_c$, for transmission of the incident light in a direction substantially perpendicular to a plane of the optical filter 10. Dimensions of the sub-wavelength periodic structure 16 can be varied during manufacture of the optical filter 10 to provide one or more optical interference filter elements 18 of predetermined sizes spaced laterally across the optical filter 10 as shown in FIG. 1, with each filter element 18 having predetermined light transmission characteristics, including a predetermined center wavelength, $\lambda_c$, a predetermined transmission bandwidth, $\Delta\lambda_c$, (i.e. a range or band of wavelengths symmetric about the center wavelength), and a predetermined polarization response characteristic.

The optical filter 10 of the present invention is further described herein with reference to a series of examples thereof.

EXAMPLE 1

Figure 2:
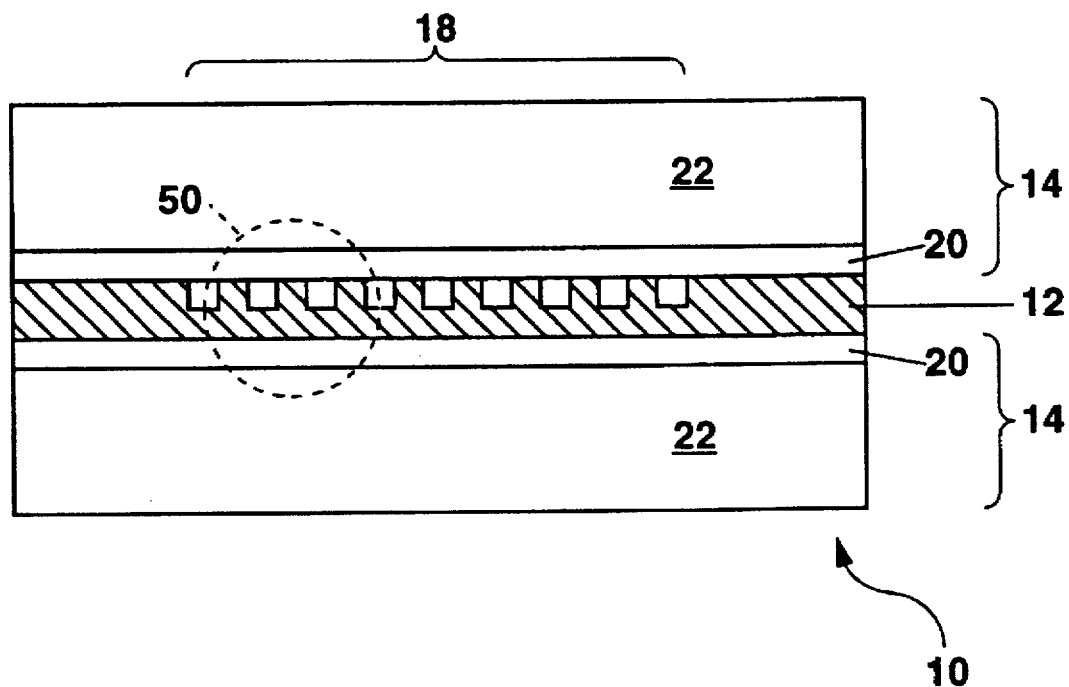
FIG. 2 shows a schematic partial cross-section view and an enlarged view of a first example of an optical filter according to embodiment of the present invention of FIG. 1.
Figure 2:
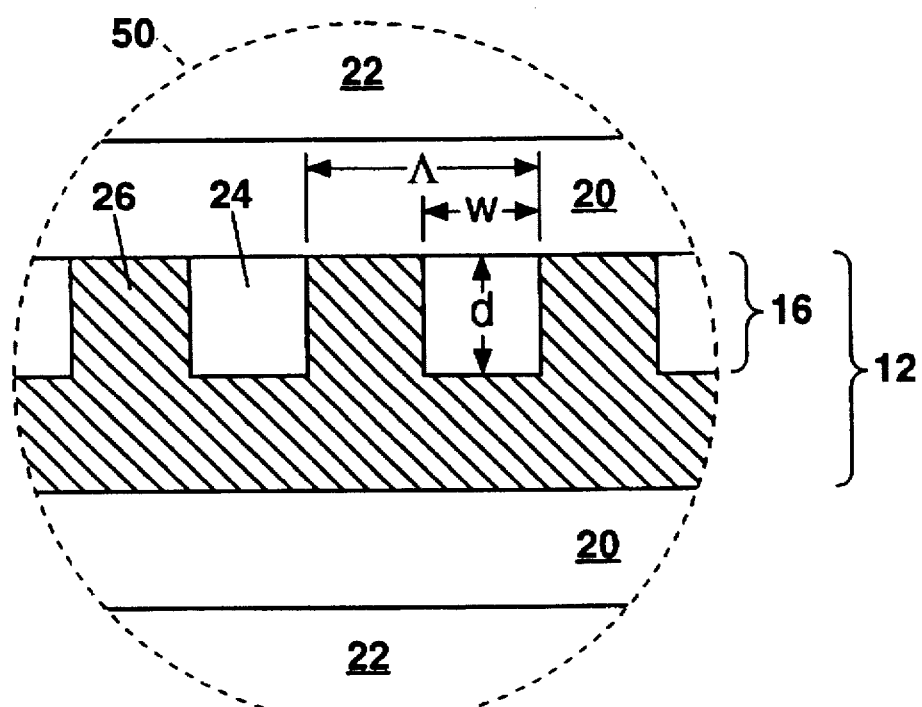

FIG. 2 shows a schematic partial cross-section view and an enlarged view of a first example of an optical filter 10 according to the embodiment of present invention shown in FIG. 1. In FIG. 2, each of the mirrors 14 is formed by depositing (e.g. by vacuum evaporation or sputtering) on a substrate 22 a single layer 20 of a reflecting material (e.g. a metal such as Al, Ag, An, Cu, Mo or the like) of sufficient layer thickness to provide a predetermined reflectivity, R, of up to about 95% or more at a predetermined center wavelength, $\lambda_c$. The substrate 22 can comprise any amorphous or crystalline material (e.g. glass, fused silica, silicon or the like) that is substantially transparent to light within a predetermined wavelength interval.

The predetermined reflectivity, R, of each of the mirrors 14 can be achieved by controlling the thickness of the single layer 20 during deposition, or by selecting a particular composition for the layer 20. The mirror reflectivity, R, is an important parameter for the optical filter 10 since it defines a finesse, F, for the resonant optical cavity formed by the mirrors 14 according to:

$$F = \frac{\pi \sqrt{R}}{1-R}$$

with the finesse, F, being related to the light transmission bandwidth, $\Delta\lambda_c$, by:

$$\Delta\lambda_c = \frac{\lambda_c}{F}$$

with F generally being in the range of about 10–100.

In the first example of the present invention in FIG. 2, the mirrors 14 are planar and parallel to form a Fabry-Perot cavity. The mirrors 14 are spaced by a distance, L, given by:

$$L = \frac{m\lambda_c}{2n_L}$$

where m is a positive integer, $\lambda_c$ is the center wavelength for transmission of light for a selected optical interference filter element 18, and $n_L$ is an effective index of refraction volume averaged over the size of the selected filter element 18 and the mirror spacing, L. The mirror spacing, L, provides a fundamental resonance in the Fabry-Perot optical cavity at the center wavelength, $\lambda_c$, so that incident light is filtered with components thereof being transmitted through the optical filter 10 over the bandwidth, $\Delta\lambda_c$. In other embodiments of the optical filter 10 of the present invention, an air gap or a transparent spacer layer can be used to further separate the mirrors and provide a mirror spacing, L, when the thickness of the dielectric layer 12 is smaller than L.

Additional light transmission can occur at Fabry-Perot cavity resonances other than the fundamental resonance (i.e. at higher-order resonances spaced from the center wavelength, $\lambda_c$, by $\pm\lambda_c^2/2n_L L$ or multiples thereof) unless these higher-order resonances (and other light leakage) are blocked by providing one or more blocking filters (not shown) in the optical filter 10. The blocking filters can include high-pass cut-off filters and low-pass cut-off filters (e.g. formed from color glasses), with one or more blocking filters being located in the optical filter 10 above and/or below the resonant optical cavity formed by the mirrors 14.

In FIG. 2, the dielectric layer 12 is patterned to provide one or more regions comprising a sub-wavelength periodic structure 16 as shown in the enlarged view 50. The sub-wavelength periodic structure 16 has a periodicity, $\Lambda$, in at least one lateral dimension thereof that is preferably less than about one-half the center wavelength, $\lambda_c$, so that the periodic structure 16 does not substantially diffract the incident light. The use of the sub-wavelength periodic structure 16 according to the present invention is to provide an effective index of refraction within the dielectric layer 12 that is different from the index of refraction of the material forming a majority of the dielectric layer 12.

In some embodiments of the present invention, the periodic structure 16 can comprise a plurality of spaced trenches or grooves 24 formed in the dielectric layer 12 to form a zeroth-order diffraction grating structure (i.e. a diffraction grating having no diffracted orders of the incident light other than a zeroth order of diffraction that provides for no substantial alteration in a direction of propagation of the incident light). A zeroth-order grating structure is useful to provide the periodic structure 16 with a single axis of symmetry in the plane of the dielectric layer 12, thereby providing a slightly different transmission wavelength for different polarization components of the incident light. This can provide the optical filter 10 with a predetermined polarization response characteristic so that different polarization components of the incident light such as transverse magnetic (TM) or transverse electric (TE) polarization components can be selectively filtered, separated, or detected.

In other embodiments of the present invention, the periodic structure 16 can have a pair of orthogonal axes of symmetry in the plane of the dielectric layer 12, thereby making the optical filter 10 substantially insensitive to a polarization state of the incident light (i.e. transmitting both TE and TM polarization components of the light), so that the incident light can be filtered regardless of a polarization state thereof (including an unpolarized state). Such a polarization-insensitive periodic structure 16 can be formed, for example, by etching downward into the dielectric layer 12 to a predetermined depth, d, and forming a unit-cell pattern of lateral dimensions equal to the periodicity, $\Lambda$. The unit-cell pattern can comprise a plurality of square shaped wells and/or generally rectangular trenches in a predetermined arrangement about the pair of orthogonal axes of symmetry.

In the first example of the optical filter 10 of present invention in FIG. 2, the center wavelength, $\lambda_c$, for each optical interference filter element 18 can be predetermined, at least in part, during manufacture of the optical filter 10 by adjusting dimensions of the periodic structure 16 (e.g. a width, w, and a depth, d, of the trenches or grooves 24). Any change in the dimensions of the periodic structure 16 during formation thereof acts to change the effective index of refraction, $n_L$, of the dielectric layer 12, thereby directly changing the center wavelength, $\lambda_c$; since to first order (i.e. for m=1), the center wavelength is given by:

$$\lambda_c = 2n_L L$$

with L being the mirror spacing. In the example of FIG. 2, the mirror spacing, L, is generally constant, being determined by an as-formed layer thickness of the dielectric layer 12.

According to the first example of the optical filter 10 of the present invention in FIG. 2, the dimensions of the periodic structure 16 at the location of each optical interference filter element 18 can be determined by a selective etching process (e.g. anisotropic dry etching) whereby the dielectric layer 12 is etched through a patterned mask formed over the dielectric layer 12. The patterned mask can comprise a resist layer that has been exposed by a focused electron beam, by x-rays, or by ultraviolet or visible light and developed to provide a plurality of shaped apertures through the resist layer with dimensions substantially equal to the predetermined dimensions of the periodic structure 16. Although the sub-wavelength periodic structure 16 is shown in FIG. 2 with a square cross-section profile for the trenches or grooves 24 and adjacent ribs 26, it will be understood by those skilled in the art that the periodic structure 16 can have other cross-section profiles, including triangular and sinusoidal profiles (e.g. formed by a wet etching process).

When the optical filter 10 comprises a plurality of optical interference filter elements 18 spaced to form a one- or two-dimensional planar array (e.g. as in FIG. 1), at least one of the filter elements 18 can generally be left unetched, thereby providing a center wavelength, $\lambda_c$, that is determined by the index of refraction of the material forming the majority of the dielectric layer 12 and by the thickness, L, of the dielectric layer 12. The remaining optical interference filter elements 18 in the planar array can then include sub-wavelength periodic structures 16 having dimensions selected to provide for transmission of the incident light at different predetermined wavelengths.

FIGS. 3A-3D show a series of steps for forming an optical filter 10 according to the first example of the present invention in FIG. 2.

Figure 3A:
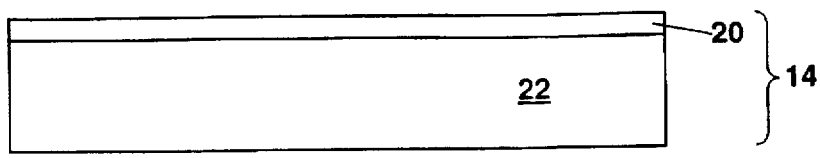
FIGS. 3A–3D show a series of steps for forming the first example of the optical filter of FIG. 2.

In FIG. 3A, each mirror 14 is formed by depositing (e.g. by vacuum evaporation) a single thin layer 20 (e.g. about 0.2–1 μm thick) of a reflecting material such as a metal on one surface of a transparent substrate 22. The other surface of each substrate 22 can be left uncoated; or alternately an anti-reflection coating can be applied to the other surface to reduce any reflection of the incident light. Additionally, the uncoated surface of one or both substrates 22 can be provided with a patterned opaque layer such as a patterned metallization (not shown) to provide one or more transmitting apertures therethrough for defining the size of each optical interference filter element 18. This is useful to prevent any light transmission in regions of the optical filter 10 other than at the locations of each filter element 18.

Figure 3B:
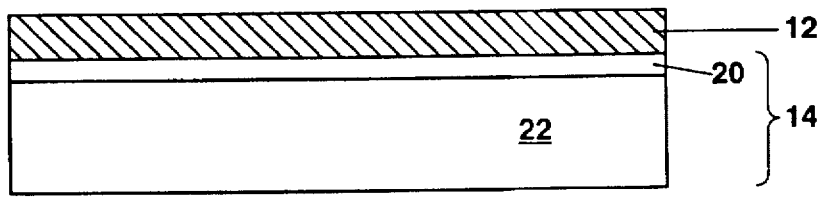

In FIG. 3B, the reflecting layer 20 of one of the mirrors 14 is overcoated with a thickness, L, of a dielectric material (e.g. silicon dioxide) to form the dielectric layer 12.

Figure 3C:
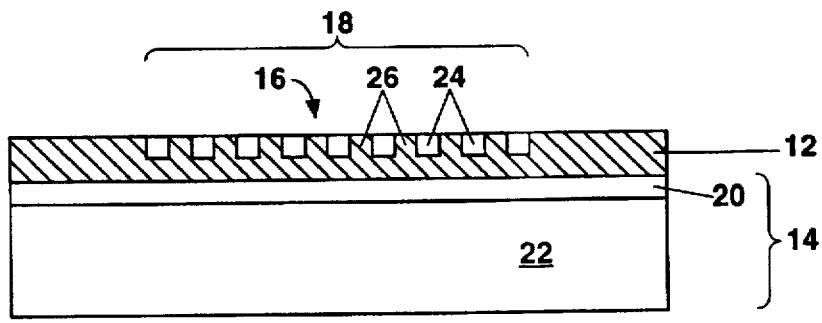

In FIG. 3C, the dielectric layer 12 is patterned to form one or more sub-wavelength periodic structures 16 therein corresponding to the individual optical interference filter elements 18. The patterning process can include forming a resist layer (not shown) over the dielectric layer 12; exposing the resist layer with a focused electron beam or the like to provide a spatial pattern of predetermined lateral dimensions to be replicated at the location of each sub-wavelength periodic structure 16; and developing the resist layer to provide a plurality of shaped apertures therethrough to expose surface portions of the dielectric layer 12. An etching step (e.g. anisotropic dry etching in a plasma) can then be performed to remove material from the dielectric layer 12 to a predetermined depth, d, below the exposed surface portions.

Figure 3D:
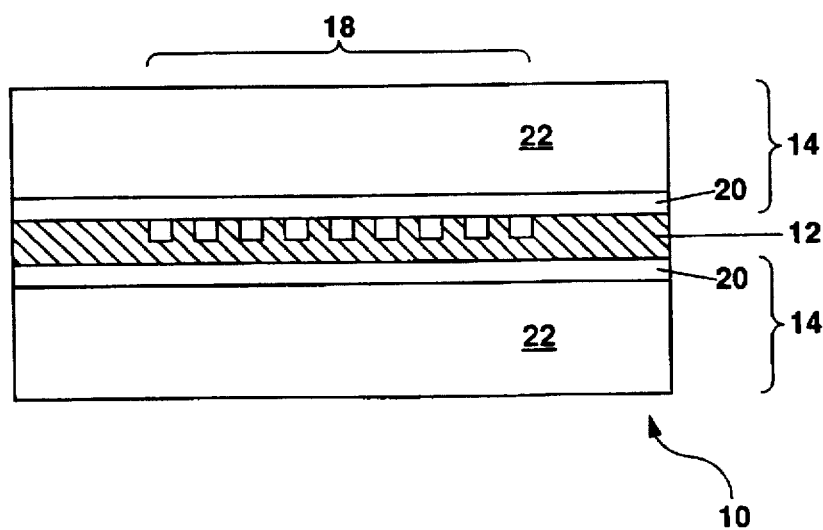

In FIG. 3D, the two mirrors 14 are sandwiched then together with the dielectric layer in-between to form the resonant optical cavity. The mirrors (and blocking filters or detector elements if used) can be adhered together by clamping (e.g. in a clamping fixture or mount), wafer bonding, van der Waals bonding, or adhesives (e.g. an epoxy resin applied around the edges of the optical filter 10). A transparent adhesive can also be used to adhere one or more blocking filters or detector elements to an exposed outer surface of one or both substrates 22.

EXAMPLE 2

Figure 4:
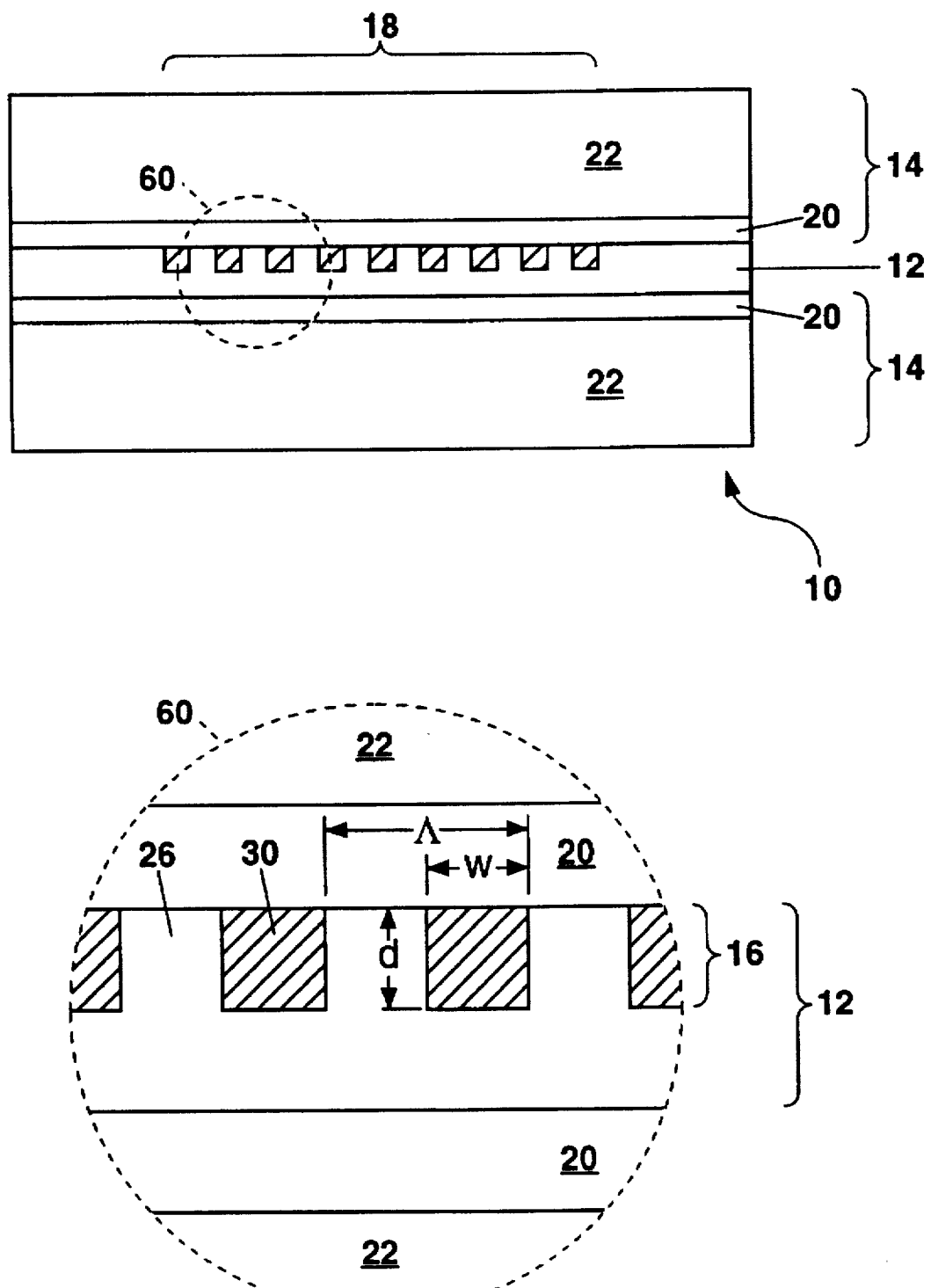
FIG. 4 shows a schematic partial cross-section view and an enlarged view of a second example of an optical filter according to embodiment of the present invention of FIG. 1.

FIG. 4 shows a schematic partial cross-section view and an enlarged view of a second example of an optical filter 10 according to the embodiment of the present invention in FIG. 1. This second example of the optical filter 10 can have a layered structure similar to that of the first example except that the sub-wavelength periodic structure 16 in the dielectric layer 12 is formed by providing a plurality of shaped regions 30 in the dielectric layer 12 with the shaped regions 30 (see enlarged view 60 in FIG. 4) having an index of refraction that is different from the index of refraction of a dielectric material forming a majority of the dielectric layer 12. In this way, the sub-wavelength periodic structure 16 can provide each optical interference filter element 18 with an effective index of refraction that is different from the index of refraction of the dielectric material forming the majority of the dielectric layer 12. The shaped regions 30 in the form of filled-in trenches, wells or the like further have a periodicity, $\Lambda$, in at least one lateral dimension thereof that is less than about one-half of a predetermined center wavelength, $\lambda_c$. When formed as a planar array, the optical filter 10 can have a plurality of spaced optical interference filter elements 18 with slightly different center wavelengths, $\lambda_c$, by providing a plurality of periodic structures 16 with shaped elements 30 of different dimensions and/or material compositions.

FIGS. 5A–5D show a series of steps for forming the second example of the optical filter 10 of FIG. 4.

Figure 5A:
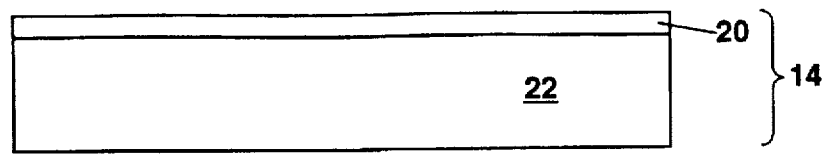
FIGS. 5A–5D show a series of steps for forming the second example of the optical filter of FIG. 4.

In FIG. 5A, each of a pair of mirrors 14 can be formed as in FIG. 3A by depositing or coating a single thin layer 20 of a reflecting material on a transparent substrate 22 such as glass, fused silica, silicon or the like.

Figure 5B:
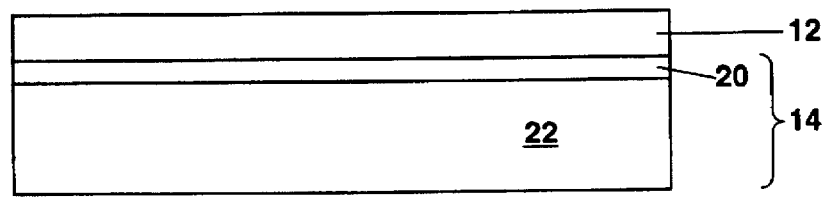
Figure 5C:
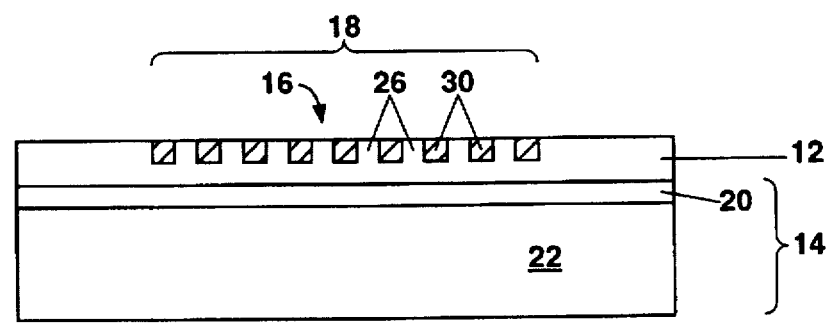

In FIG. 5B, the reflecting layer 20 of one of the mirrors 14 can be overcoated with a thickness, L, of a predetermined dielectric material to form a dielectric layer 12 in a manner similar to that of FIG. 3B. The particular type of dielectric material (e.g. an amorphous material such as glass or silicon dioxide; or a polymer; or a crystalline material such as monocrystalline silicon or polycrystalline silicon) used in forming the dielectric layer will in general depend upon a predetermined center wavelength, $\lambda_c$, and a particular process used for forming the sub-wavelength periodic structure 16.

As an example, a polymer dielectric layer 12 can be patterned to form one or more sub-wavelength periodic structures 16 therein by a holographic lithography process whereby the polymer layer 12 is irradiated by a pair of ultraviolet or violet laser beams intersecting at a predetermined angle at the exposed upper surface of the dielectric layer 12. The intersecting laser beams can form a interference pattern having intensity maxima of the laser light spaced at the predetermined periodicity, $\Lambda$. The polymer dielectric layer 12 can be exposed to laser irradiation for sufficient time to provide for a cross-linking of polymer molecules (with or without subsequent processing of the irradiated dielectric layer 12), thereby forming the shaped regions 30 of the sub-wavelength periodic structure 16 (e.g. in the form of a zeroth-order diffraction grating).

As yet another example, a polymer, glass, silicon dioxide, or silicon dielectric layer 12 can be implanted with ions (e.g. hydrogen, beryllium, boron, oxygen, titanium or gallium ions) at the locations of the shaped regions 30 by irradiating the dielectric layer 12 with a focused ion beam for a predetermined period of time; or alternately with an unfocused ion beam by providing an electron beam patterned resist layer (i.e. a mask) on the dielectric layer 12 as described heretofore. The ions implanted at sufficient energy to penetrate into the dielectric layer 12 to a depth, d, can then alter the index of refraction of the dielectric material at the locations of the shaped regions 30 with or without a change in chemical composition of the dielectric material forming the majority of the dielectric layer 12. In some instances, the ion beam irradiation step can be followed by a thermal annealing step to anneal out any ion-induced damage within the shaped regions 30, or to effect a change in material composition within the shaped regions 30.

Figure 5D:
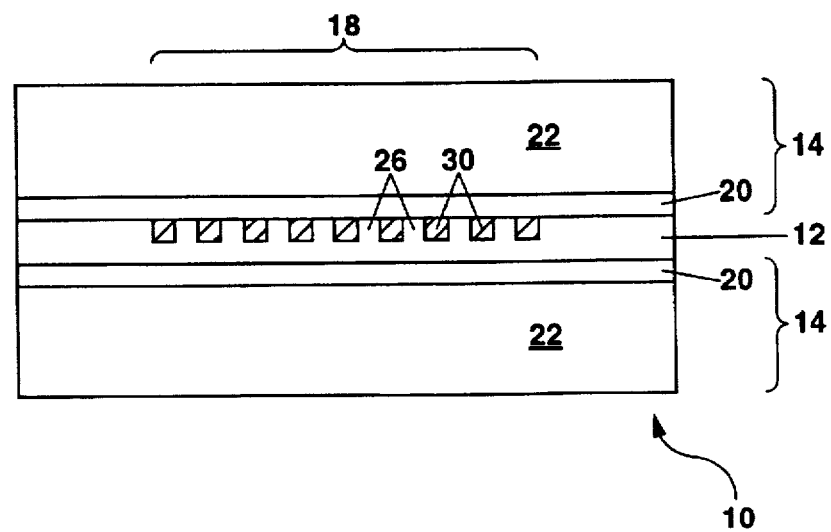

After formation of the sub-wavelength periodic structure 16 at locations within the dielectric layer 12 corresponding to one or more filter elements 18, the other mirror 14 of the pair can be sandwiched over the patterned dielectric layer 12 as shown in FIG. 5D to form the resonant optical cavity of the optical filter 10.

EXAMPLE 3

Figure 6:
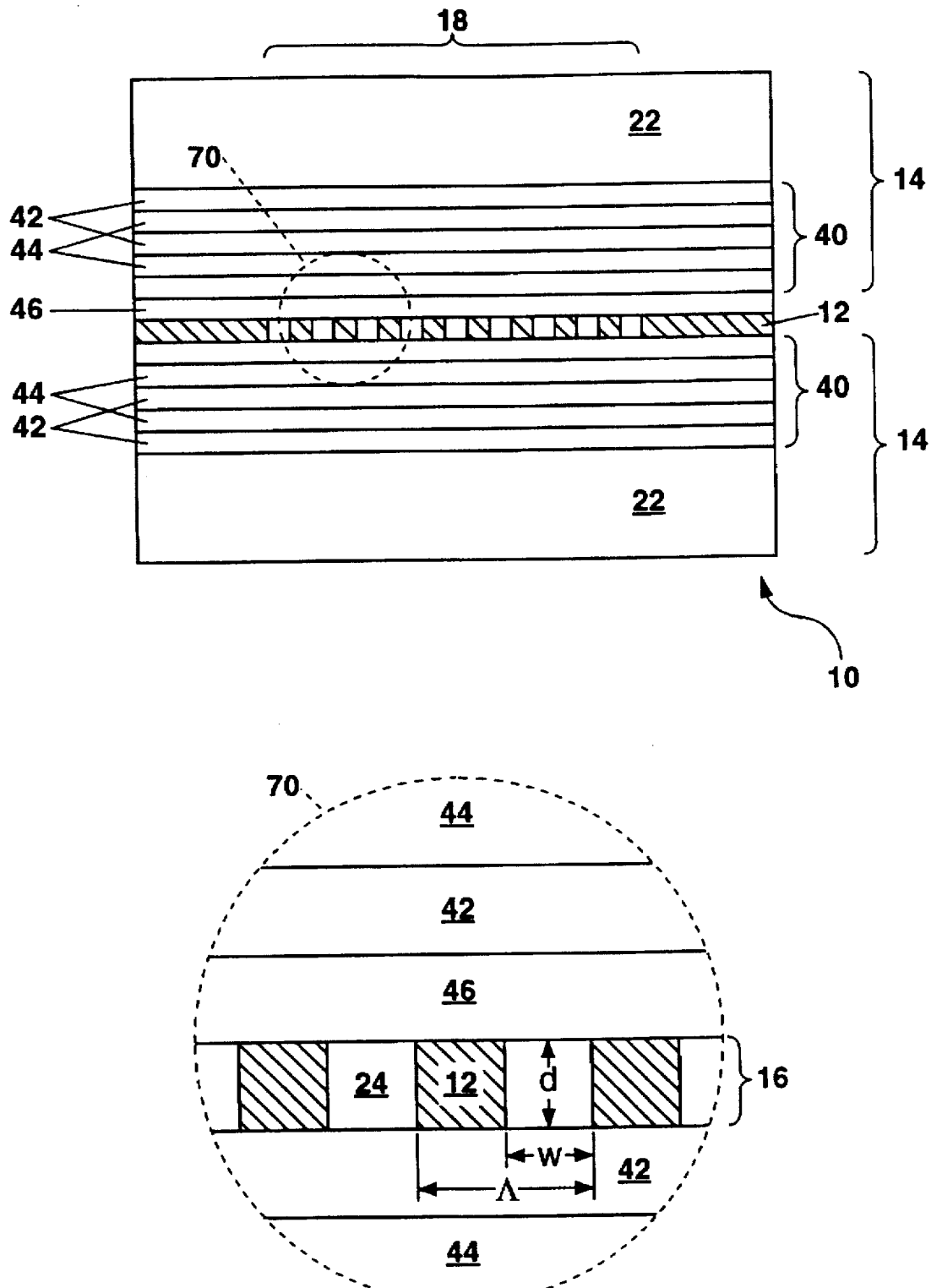
FIG. 6 shows a schematic partial cross-section view and an enlarged view of a third example of an optical filter according to the embodiment of the present invention of FIG. 1.

FIG. 6 shows a schematic partial cross-section view and an enlarged view of a third example of an optical filter 10 according to the embodiment of the present invention in FIG. 1.

For this third example of the present invention, the optical filter 10 comprises a plurality of alternating high-refractive-index layers 42 (e.g. silicon) and low-refractive-index layers 44 (e.g. silicon dioxide), with each of the layers 42 and 44 being about one-quarter wavelength thick (i.e. about one-quarter of a predetermined center wavelength, $\lambda_c$). As used herein, the term high-refractive-index layers refers to those layers used for forming a multiple-layer reflecting stack 40 (i.e. a distributed Bragg reflector) that have the highest index of refraction; and the term low-refractive-index layers refers to those layers of the stack 40 which have an index of refraction less than that of the high-refractive-index layers 42. Particular values of the index of refraction of the high-refractive-index layers 42 and low-refractive-index layers 44 will vary depending upon the particular materials used for forming the layers 42 and 44.

In FIG. 6, the centermost two layers (i.e. a dielectric layer 12 and a spacer layer 46) preferably have the same index of refraction and define a one-half-wavelength mirror spacing, L, for a resonant optical cavity formed by the stack mirrors 14 (i.e. distributed Bragg reflector mirrors) comprising the remaining high-refractive-index layers 42 and low-refractive-index layers 44. The ordering of the layers 42 and 44 is shown in FIG. 6 for low-refractive-index substrates 22 (e.g. silicon dioxide), and can be reversed for use of high-refractive-index substrates 22 (e.g. silicon). Furthermore, the exact number of layers 42 and 44 will in general depend on a difference, $\Delta n$, in the indices of refraction, n, of the high-refractive-index layers 42 and the low-refractive-index layers 44. Only three high-refractive-index layers 42 are required to provide a reflectivity of about 98% when silicon (e.g. polysilicon with n=3.42) is used for the high-refractive-index layers 42 and silicon dioxide (n=1.45) is used for the low-refractive-index layers 44 due to a large index difference of $\Delta n=1.97$. For other embodiments of the present invention, additional layers 42 and 44 can be used when $\Delta n$ is smaller, with $\Delta n$ preferably being larger than about 0.2.

In FIG. 6, the pair of stack mirrors 14 form a resonant optical cavity that includes a dielectric layer 12 having a sub-wavelength periodic structure 16 formed therein to define, at least in part, a wavelength (i.e. the center wavelength, $\lambda_c$) for transmission of a portion of the incident light. The sub-wavelength periodic structure 16 and dimensions thereof is shown in the enlarged view 70 in FIG. 6.

The use of stack mirrors 14 (also termed distributed Bragg reflector mirrors) for the optical filter 10 is advantageous in providing a more precise control over the reflectivity of each mirror 14 than is possible with the single-layer mirrors 14 described heretofore for the first and second examples of the present invention. Additionally, stack mirrors 14 can provide a higher reflectivity (up to about 98% or more) than is generally possible with single-layer mirrors, thereby increasing the finesse, F, of the resonant optical cavity, and reducing the transmission bandwidth, $\Delta\lambda_c$. This can be important for filtering incident light having a plurality of closely-spaced wavelength components or spectral features that must be individually separated. Finally, stack mirrors 14 are easy to fabricate for use at any wavelength interval from the ultraviolet to the far-infrared. This is advantageous for embodiments of the optical filter 10 in the form of a spectrometer or chemical sensor, especially in the infrared region of the spectrum (e.g. 1–10 µm) where characteristic spectral features of many chemical species (e.g. organic molecules) are found.

Such an optical filter 10 in the form of a spectrometer or chemical sensor (or alternately a colorimeter) can be simply and easily formed by combining a planar array of optical interference filter elements 18 (with individual filter elements 18 having center wavelengths, $\lambda_c$, matched to specific spectral features of one or more selected chemical species, or to selected colors of light) with a plurality of detector elements (not shown) each aligned with one of the filter elements 18 for detecting or quantifying any incident light transmitted therethrough so that the transmitted light can be correlated with the selected chemical species (or colors of light).

Alternately, an optical filter 10 in the form of a spectrometer or a chemical sensor can comprise a plurality of optical interference filter elements 18 with regularly-spaced center wavelengths, $\lambda_c$, for measuring an entire spectrum of wavelengths and sensing any chemical species having spectral features therein. Since each filter element 18 can have a size as small as about 150 µm, the spectrometer or chemical sensor can be miniaturized so that many such devices can be fabricated simultaneously and separated for packaging, thereby saving time and money.

For other embodiments of the present invention, the optical filter 10 can include a detector array integrated therewith by forming a plurality of spaced detector elements on a surface of one of the substrates 22 (e.g. a silicon or GaAs substrate), with individual detector elements being in optical alignment with each of the optical interference filter elements 18.

Figure 7A:
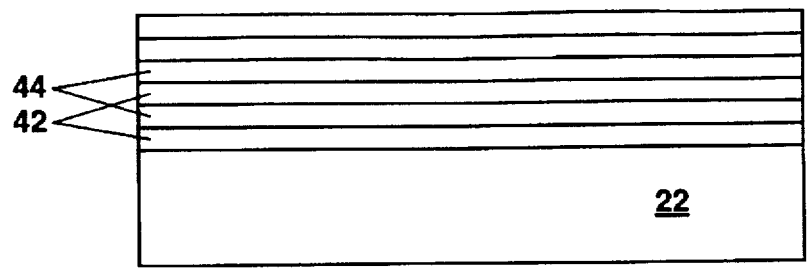
FIGS. 7A–7C show a series of steps for forming the third example of the optical filter of FIG. 6.
Figure 7B:
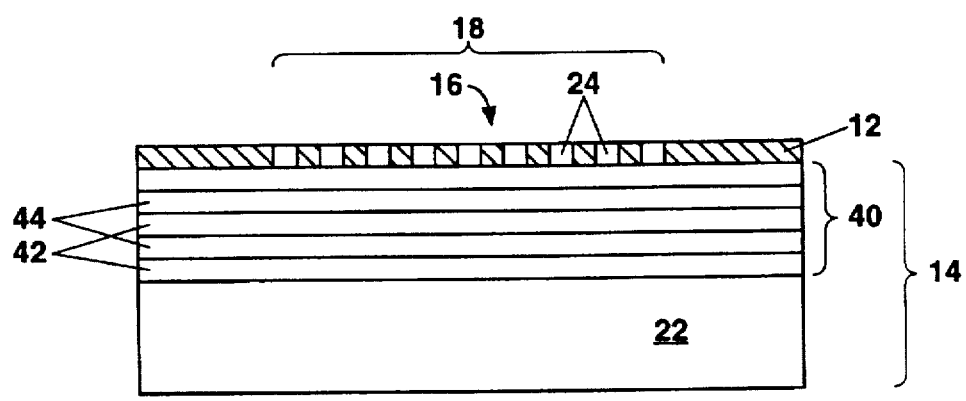
Figure 7C:
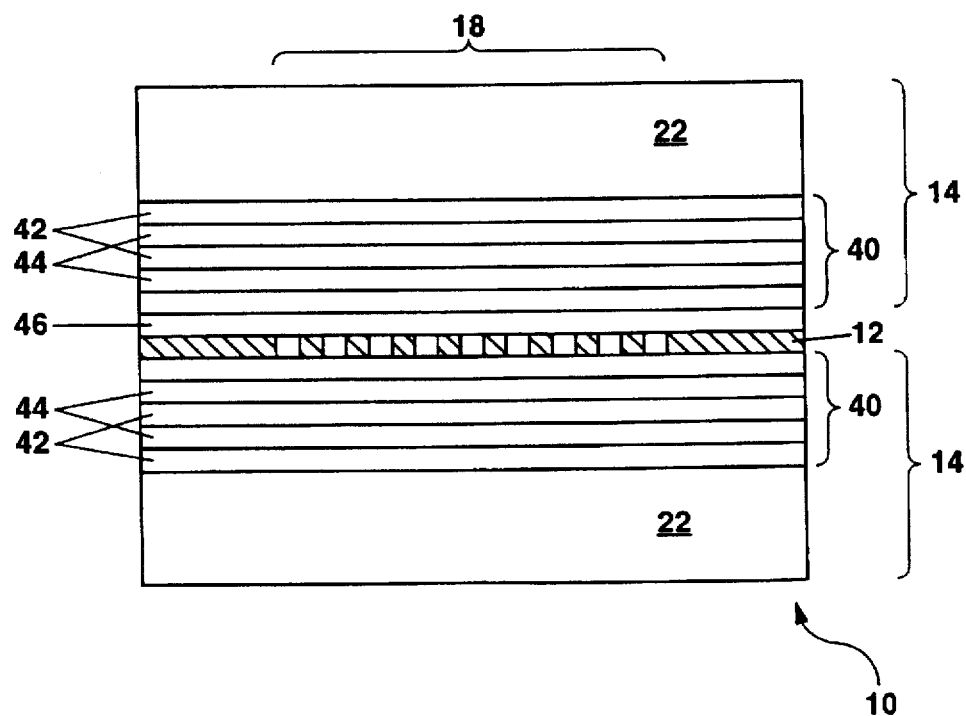

FIGS. 7A–7C show a series of steps for forming the third example of the optical filter 10 of FIG. 6.

In FIG. 7A, a plurality of layers are deposited on each of a pair of silicon dioxide substrates 22, with the layers comprising alternating high-refractive-index layers 42 of silicon (e.g. polysilicon) and low-refractive-index layers 44 of silicon dioxide. The one-quarter-wavelength thick layers 42 and 44 can be used to form the stack mirrors 40, with the uppermost layers in this example being silicon dioxide for use in forming the spacer layer 46 on one of the substrates 22 and the dielectric layer 12 on the other substrate 22.

In FIG. 7B, the silicon dioxide dielectric layer 12 is patterned by an etching step (e.g. dry etching in a fluorine-based plasma such as $CH_3F$ using an electron-beam-patterned mask of predetermined lateral dimensions) to form a sub-wavelength periodic structures 16 therein at the location of one or more optical interference filter elements 18. The layer of polysilicon 42 underlying the uppermost silicon dioxide layer 44 can be used as an etch stop to provide a one-quarter-wavelength depth, d, for the etched trenches or grooves 24.

Each sub-wavelength periodic structure 16 can comprise either a plurality of spaced trenches or grooves 24 as shown in FIG. 7B to form a polarization-selective optical filter 10, or alternately a plurality of oriented square shaped wells and rectangular trenches to form a polarization-insensitive optical filter 10. In some embodiments of the present invention both types of sub-wavelength periodic structures 16 can be used, for example, so that different polarization states of the incident light can be independently measured or separated.

In FIG. 7C, after formation of the sub-wavelength periodic structure 16 at locations within the dielectric layer 12 corresponding to one or more optical interference filter elements 18, the other mirror 14 having the spacer layer 46 thereon can be sandwiched over the patterned dielectric layer 12 to form the resonant optical cavity. The exposed surfaces of the two silicon dioxide layers (i.e. the spacer layer 46 and the dielectric layer 12) can be contacted during assembly of the optical filter 10 and adhered together by means of van der Waals bonding. Alternately, the mirrors 14 and the dielectric layer 12 sandwiched therein can be adhesively bonded or clamped together. Although not shown in FIGS. 6 and 7C, the completed optical filter 10 can further include one or more blocking filters and/or detector elements.

Figure 8:
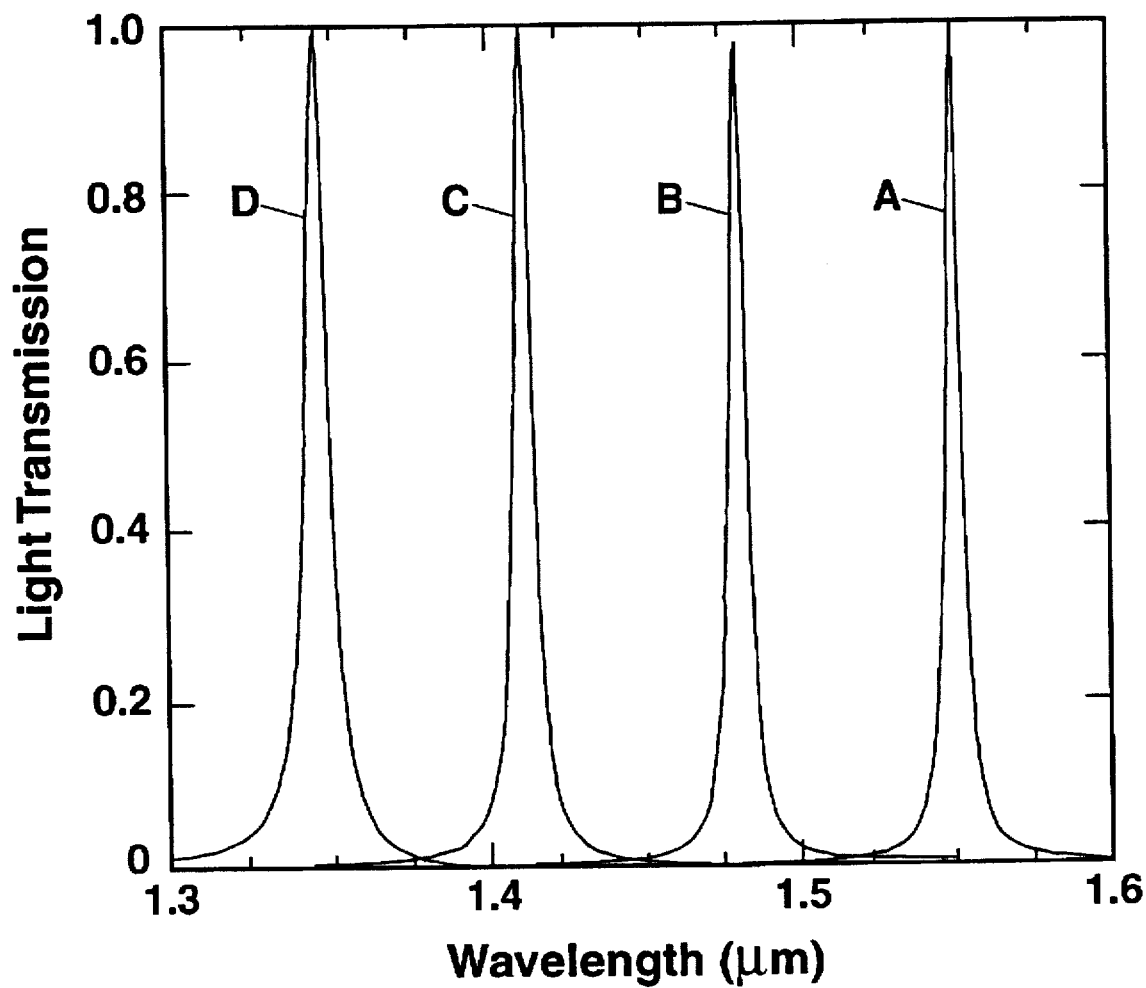
FIG. 8 shows a series of calculated spectral response curves for four optical interference filter elements in an optical filter formed according to the third example of FIG. 6, with each filter element having different lateral dimensions for any sub-wavelength periodic structure therein.

FIG. 8 shows a series of calculated spectral response curves for a planar array optical filter 10 formed according to the third example of FIG. 6 with four optical interference filter elements 18. Each stack mirror 14 of the optical filter 10 has a mirror reflectivity of about 98%, providing a calculated transmission bandwidth of about 8 nanometers.

For these calculations, sub-wavelength periodic structures 16 (in the form of a zeroth-order diffraction gratings comprising elongated trenches or grooves 24 with a periodicity Λ=0.4 μm) are present in three of the optical interference filter elements 18, with the fourth filter element 18 having no periodic structure 16 therein.

In FIG. 8, the predetermined center wavelength, $\lambda_c$, for the fourth optical interference filter element 18 at 1.55 μm is labelled as curve "A". Spectral response or light transmission curves for the other three optical interference filter elements 18 are shown in FIG. 8 as curves labelled "B", "C" and "D" corresponding to a width, w, of the sub-wavelength periodic structures 16 being 0.25 Λ, 0.5 Λ, or 0.75 Λ, respectively, to provide regularly-spaced center wavelengths, $\lambda_c$. All the curves in FIG. 8 are calculated for light polarized along a major axis of the trenches in the sub-wavelength periodic structures 16 (i.e. for TE-polarized light).

For the planar array optical filter 10 of FIG. 8, the light transmission curves span a wavelength interval, $\Delta\lambda_{A-D}$, equal to about 120 nanometers between the center wavelengths for the curves "A" and "D" at a wavelength near 1.5 μm. This wavelength interval, $\Delta\lambda_{A-D}$, can be doubled if similar periodic structures 16 are also formed within the spacer layer 46 at the locations of each optical interference filter element 18. Alternately, by forming the dielectric layer 12 from a material having an index of refraction higher than that of silicon dioxide (n=1.45), the wavelength interval, $\Delta\lambda_{A-D}$, can be increased since:

$$\Delta\lambda_{A-D} = \lambda_A \left( \frac{n_d - n_t}{4n_d} \right)$$

where $\lambda_A$ is the center wavelength for the filter element 18 of curve "A", $n_d$ is the index of refraction of the material forming the dielectric layer 12, and $n_t$ is the index of refraction of the material within each trench 24 of the periodic structure 16 ($n_t=1$ for air). Thus, for example, by forming the dielectric layer 12 (and preferably also the spacer layer 46) from silicon instead of silicon dioxide, the wavelength interval, $\Delta\lambda_{A-D}$, can be increased to about 274 nanometers at a wavelength near 1.5 μm. This can be done by terminating each stack mirror 14 with a silicon dioxide layer (i.e. the low-refractive-index layer 44) instead of with a silicon layer (i.e. the high-refractive-index layer 42).

Figure 9:
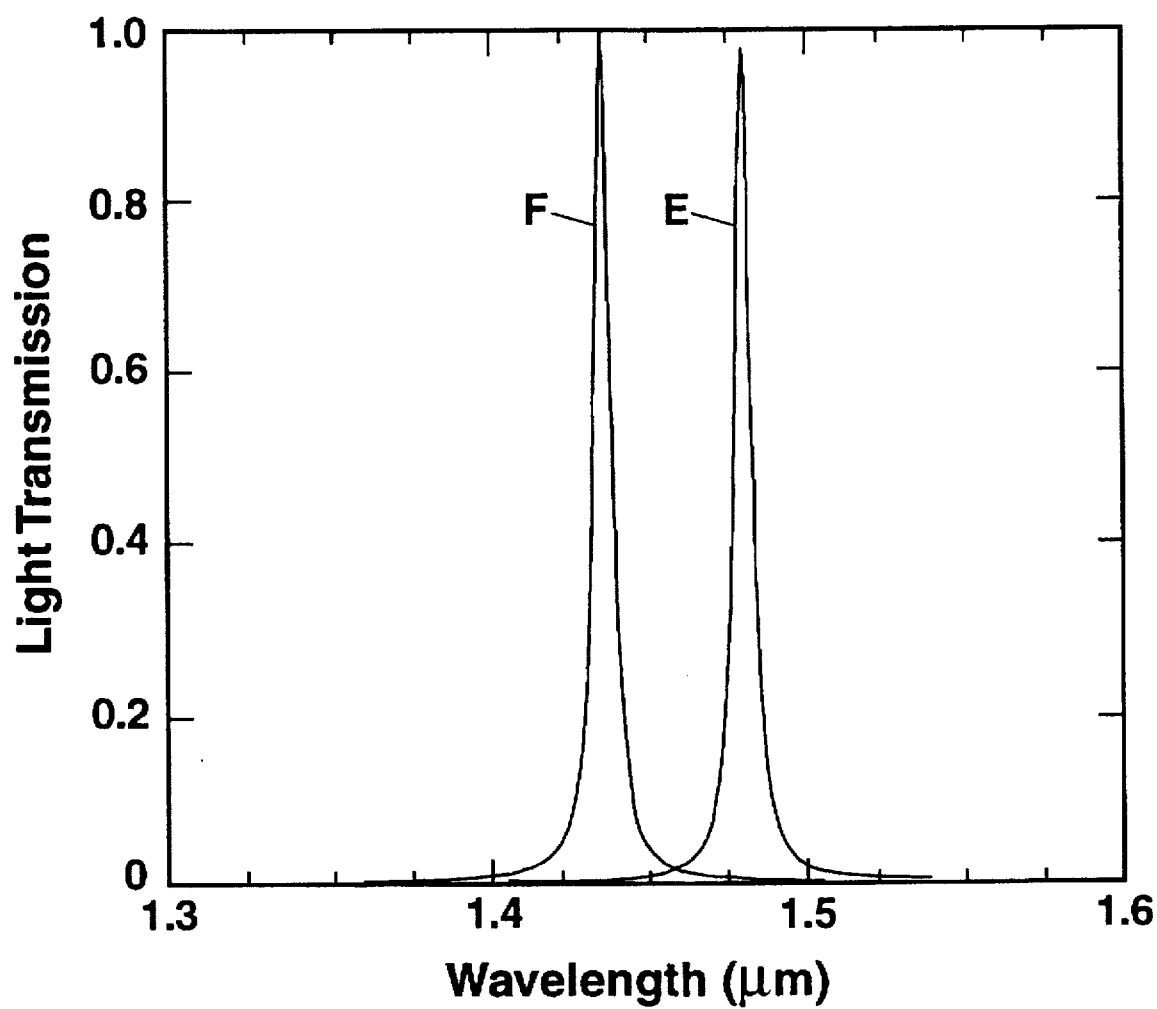
FIG. 9 shows calculated spectral response curves for a single optical interference filter element of an optical filter according to the present invention to show a polarization selectivity that can be obtained when a sub-wavelength periodic structure therein has a single axis of symmetry.

FIG. 9 shows calculated spectral response curves for different polarization states or components of the incident light for a single optical interference filter element 18 of the above four-element planar array optical filter 10 with a width w=0.25 Λ. When unpolarized light with a broad bandwidth near 1.5 μm is incident on this optical interference filter element 18, a TE-polarized component of the incident light (i.e. light polarized along a single axis of symmetry of the periodic structure 16) is transmitted at wavelengths corresponding to the response curve "E" in FIG. 9 (the curve "E" corresponds to the curve "B" of FIG. 8). Additionally a TM-polarized component of the unpolarized incident light (i.e. a component of the light that is polarized orthogonal to a single axis of symmetry of the periodic structure 16) is transmitted at shorter wavelengths corresponding to the response curve "F" in FIG. 9.

This polarization selectivity of the optical filter 10 in FIG. 9 is due to a difference, $\Delta n_L$, in the effective index of refraction, $n_L$, of the dielectric layer 12 with polarization which provides a shift in the center wavelength, $\lambda_c$, of the optical interference filter element 18 of about 45 nanometers between the TE- and TM-polarized components of the incident light. For a silicon dioxide dielectric layer 12, this difference, $\Delta n_L$, in the effective index of refraction of the dielectric layer 12 for TE- and TM-polarized light can be about 0.06. In the case of narrowband polarized incident light, an optical filter 10 having a single axis of symmetry (e.g. a zeroth-order diffraction grating for the periodic structure 16) can be used to transmit only a single polarization component (TE or TM) of the incident light depending on a selected orientation for the single axis of symmetry.

Thus, the optical filter 10 according to some embodiments of the present invention can provide a polarization selectivity for filtering, separating, or detecting light according to one or more polarization states therein.

The matter set forth in the foregoing description and accompanying drawings is offered by way of illustration only and not as a limitation. Other applications and variations of the optical filter and method will become evident to those skilled in the art. For example, an all-semiconductor optical filter 10 can be formed with a structure similar to that shown in FIGS. 6 and 7C by epitaxially growing (e.g. by molecular beam epitaxy or metalorganic chemical vapor deposition) on GaAs substrates 22 a plurality of alternating one-quarter-wavelength low-refractive-index layers 44 comprising AlGaAs and one-quarter-wavelength high-refractive-index layers 42 comprising GaAs to form a pair of stack mirrors 14. A semiconductor dielectric layer 12 having a sub-wavelength periodic structure 16 therein can then be formed from a last-grown epitaxial layer (e.g. a layer 42 or 44) on at least one of the stack mirrors 14. As another example, a silicon-based optical filter 10 for use at infrared wavelengths can be formed with a structure similar to that shown in FIGS. 6 and 7C by depositing on monocrystalline silicon substrates 22 a plurality of alternating one-quarter-wavelength thick low-refractive-index layers 44 comprising silicon dioxide and one-quarter-wavelength thick high-refractive-index layers 42 comprising polysilicon. The dielectric layer 12 having one or more sub-wavelength periodic structures 16 therein can then be formed from a last-deposited silicon dioxide or polysilicon layer according to the teaching of the present invention. Those skilled in the art will find other applications for the optical filter 10 of the present invention. For example, the optical filter 10 can be adapted for use as a multiple-channel optical communications receiver for use with one or more optical fibers containing a plurality of wavelength-multiplexed optical signals, with each optical interference filter element 18 acting to spectrally and spatially separate light of a specific wavelength and thereby demultiplex the optical signals to recover information therefrom. Thus, the actual scope of the invention is intended to be defined in the following claims when viewed in their proper perspective based on the prior art.

What is claimed is:

1. An optical filter for filtering incident light, comprising:
   at least one filter element, with each filter element further having
   a dielectric layer with a sub-wavelength periodic structure formed therein to provide an effective index of refraction for the dielectric layer that is different from the index of refraction of a material forming the dielectric layer for defining, at least in part, a predetermined center wavelength for transmission of the incident light; and
   mirrors above and below the dielectric layer to form an optical cavity thereabout.

2. The optical filter in claim 1 wherein the periodic structure forms a zeroth-order diffraction grating.

3. The optical filter in claim 1 wherein the mirrors are planar and parallel.

4. The optical filter in claim 1 wherein each mirror comprises a plurality of alternating high-refractive-index layers and low-refractive-index layers with a thickness of each of the layers being about one-quarter wavelength of the incident light.

5. The optical filter in claim 4 wherein a difference in an index of refraction of the high-refractive-index layers and the low-refractive-index layers is at least 0.2.

6. The optical filter in claim 4 wherein the high-refractive-index layers comprise silicon, and the low-refractive-index layers comprise silicon dioxide.

7. The optical filter in claim 1 wherein each filter element transmits a band of the incident light centered about the predetermined center wavelength.

8. The optical filter in claim 1 wherein the dielectric layer comprises silicon dioxide or silicon.

9. The optical filter in claim 1 wherein a plurality of filter elements are spaced to form a planar array.

10. The optical filter in claim 9 wherein each filter element in the array transmits a band of the incident light centered at a different predetermined wavelength.

11. The optical filter of claim 9 further including a detector element in optical alignment with each filter element for detecting any of the incident light transmitted therethrough.

12. The optical filter in claim 1 wherein the mirrors are spaced by a distance substantially equal to $m\lambda_c/2n_L$ where m is a positive integer, $n_L$ is an effective index of refraction of the dielectric layer for a selected filter element, and $\lambda_c$ is the wavelength for transmission of light for the selected filter element.

13. The optical filter in claim 1 further including means for blocking the incident light outside a predetermined wavelength range.

14. The optical filter in claim 1 wherein the periodic structure has a single axis of symmetry in the plane of the dielectric layer, thereby providing a different transmission wavelength for different polarization components of the incident light.

15. The optical filter in claim 1 wherein the periodic structure has a pair of orthogonal axes of symmetry in the plane of the dielectric layer, thereby being substantially insensitive to a polarization state of the incident light.

16. An apparatus for filtering incident light comprising a plurality of deposited layers, with at least two layers forming a resonant cavity and another of the layers being located within the resonant cavity and including at least one sub-wavelength periodic structure for defining, at least in part, a predetermined center wavelength for transmission of a component of the incident light through the resonant cavity by providing an effective index of refraction for the dielectric layer that is different from the index of refraction of a material forming the dielectric layer within the resonant cavity.

17. The apparatus of claim 16 in the form of a filter array with each sub-wavelength periodic structure forming a filter element for filtering the light at a different predetermined center wavelength.

18. The apparatus of claim 17 further including a detector element in optical alignment with each filter element to detect any filtered light at the different predetermined center wavelength.

19. An optical filter comprising:

a layered structure which includes an optical cavity formed by a pair of planar mirrors; and a sub-wavelength periodic structure located within the optical cavity for defining, at least in part, a predetermined center wavelength for transmission of light through the layered structure in a direction substantially perpendicular to a surface thereof by providing an effective index of refraction within the optical cavity that is different from the index of refraction of a dielectric material forming the sub-wavelength periodic structure.

20. An optical filter for transmitting light within at least one wavelength band centered at a predetermined wavelength, comprising;

a pair of reflecting mirrors arranged to form an optical cavity; and a dielectric layer formed on a surface of one of the mirrors within the optical cavity and having in at least one portion thereof an effective optical thickness substantially equal to an integer multiple of one-half the predetermined wavelength, with the effective optical thickness being determined, at least in part, by a sub-wavelength periodic structure formed within the dielectric layer and having an effective index of refraction different from the index of refraction of a material forming the dielectric layer.

21. An optical filter comprising:

first and second stack mirrors having surfaces in contact to form an optical cavity, with each stack mirror further comprising a plurality of alternating high-refractive-index layers and low-refractive-index layers, and with at least one of the stack mirrors having a sub-wavelength periodic structure formed proximate to the surface thereof for providing an effective index of refraction different from the index of refraction of a material forming the sub-wavelength periodic structure, thereby defining a predetermined wavelength band for transmission of light.

22. A method for forming an optical filter comprising the steps of:

forming a pair of planar mirrors, with each mirror further comprising at least one reflecting layer;

forming a dielectric layer on at least one of the mirrors, and patterning the dielectric layer to provide at least one sub-wavelength periodic structure therein with an effective index of refraction different from the index of refraction of a material forming the dielectric layer for defining a predetermined transmission wavelength for light; and arranging the pair of mirrors to form a resonant optical cavity with the dielectric layer contained within the cavity.

23. The method of claim 22 further including a step for providing at least one detector proximate to the resonant optical cavity for detecting any light transmitted therethrough at the predetermined transmission wavelength.

* * * * *